July 31, 1934.  W. GLIDDEN  1,968,340
SCYTHE
Filed June 28, 1933
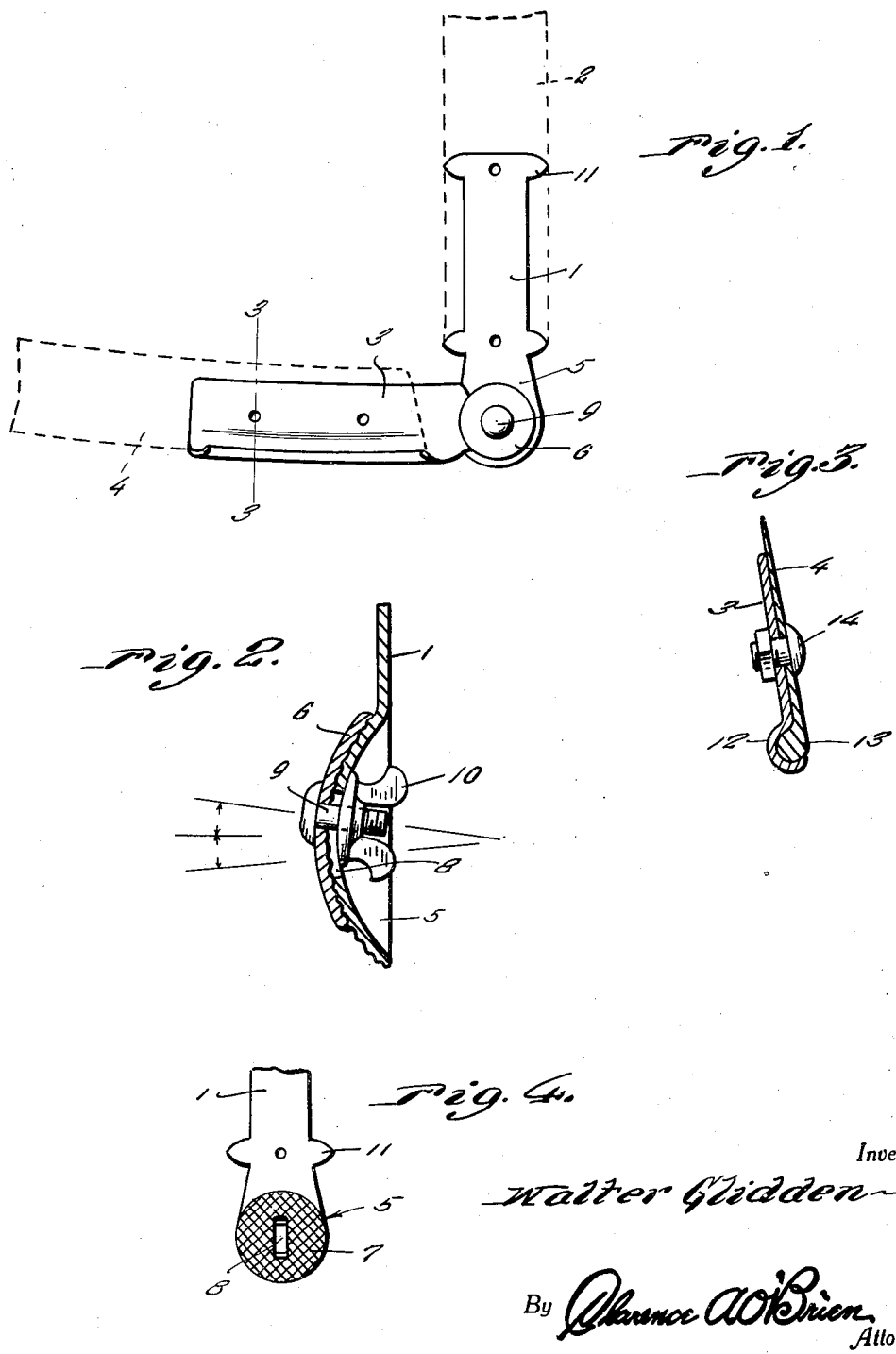
Inventor
Walter Glidden
By Clarence A. O'Brien
Attorney Patented July 31, 1934

1,968,340

UNITED STATES PATENT OFFICE 1,968,340

SCYTHE

Walter Glidden, Waterford, Ohio

Application June 28, 1933, Serial No. 678,098

1 Claim. (Cl. 56—326.3)

This invention relates to improvements in scythes, the general object of the invention being to provide means for adjustably connecting the blade to the handle or snath.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a plan view of the invention, showing portions of the blade and the handle in dotted lines.

Figure 2 is a sectional view through the joint between the two parts of the invention.

Figure 3 is a section on line 3—3 of Figure 1.

Figure 4 is a view of that part of the device which is attached to the handle.

In this drawing, the numeral 1 indicates the member which is adapted to be fastened to the handle 2, and the numeral 3 the member which is adapted to be connected to the blade 4. The member 1 is formed with a substantially semi-circular part 5 and the member 3 with a similar part 6, but this part 6 is of less diameter than the part 5. The part 6 fits on the part 5 and the contacting faces of the two parts are roughened or knurled, as shown at 7.

The member 5 has an elongated slot 8 therein which extends longitudinally of the member 1 and receives a bolt 9 which passes through a hole in the member 6. The head of the bolt is placed on the outer face of the member 6 and a wing nut 10 is threaded on the bolt and contacts the concave surface of the part 5, as clearly shown in Figure 2.

The member 1 is formed with the ears 11 for partly embracing the handle 2 while the member 3 is formed with a groove 12 to receive the bead 13 of the blade. The blade is held to the member 3 by a number of bolts 14 or the like.

Thus it will be seen that by loosening the nut 10, the two members 1 and 3 can be adjusted so as to place the blade at various angles to the ground and also place the blade at different angles to the handle. Then by tightening the nut, the parts will be held in adjusted position. If desired, washers may be placed on the bolt above and below the two parts 5 and 6.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a scythe, an elongated plate attached to the handle and having one end projecting from the lower end of the handle, a second elongated plate connected directly to the end of the blade and having one end projecting beyond said end, said second plate extending longitudinally with the blade and having its lower edge formed with a curved flange for fitting over a portion of the back of the blade, said projecting ends of the plates having concavo-convex parts formed therein, with one part resting on the other, the concavo-convex part which is connected to the plate attached to the handle having a longitudinally extending slot therein, a bolt passing through the two parts, the bolt passing through the slot in the one part and a nut on the bolt.

WALTER GLIDDEN.